United States Patent Office 3,240,717
Patented Mar. 15, 1966

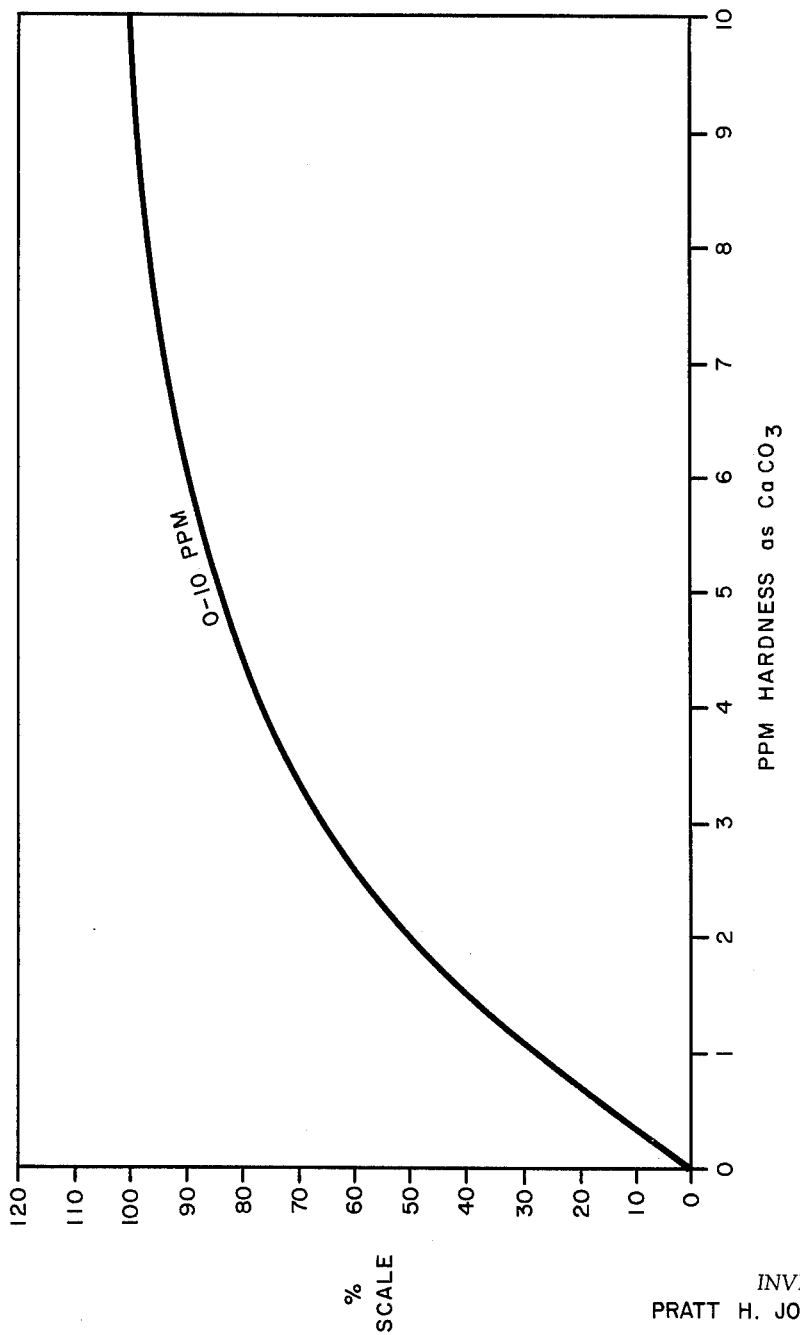

3,240,717
COLORIMETRIC REAGENT FOR INDICATING HARDNESS OF WATER
Pratt H. Johnson, St. Petersburg, Fla., assignor to Milton Roy Company, Philadelphia, Pa., a corporation of Pennsylvania
Filed Sept. 6, 1963, Ser. No. 307,065
1 Claim. (Cl. 252—408)

This invention relates to colorimetric reagents for testing water to determine the degree of total hardness thereof in parts per million (p.p.m.) of combined magnesium and calcium, and suitable for use in automatic colorimetric analyzing equipment such as that described in U.S. Patent No. 3,028,225. More particularly, the invention is directed to an improved colorimetric reagent including an indicator dye substance such as that sold under the name "Eriochrome Black T" which, in a predetermined pH range, forms a colored chelate with magnesium ions in preference to calcium ions, buffer means for maintaining the sample being tested in the desired pH range, and a magnesium containing complex such as magnesium disodium ethylene diamine tetraacetate, from which magnesium ions are displaceable by calcium ions. When the reagent is mixed with a sample, the total amount of magnesium ions available from the sample and displaced from the magnesium complex by calcium ions in the sample produces a color change of the indicator dye material which is indicative of the total hardness of the sample.

Samples of water which are analyzed for hardness vary considerably in pH depending upon their sources. For example city water supplies typically have a pH in the range of 6.5 to 8.0 while water samples from sources which have been treated by passing through zeolite softeners typically have a pH as low as 2.4. Because of the variance in pH of samples from different sources, there has not been available heretofore a single reagent which could be used to provide automatic testing of hardness of zeolite treated water as well as samples from other sources.

Accordingly, it is an object of this invention to provide an improved reagent formulation which can be used to obtain accurate hardness readings from samples regardless of widely varying in pH values.

It is another object of this invention to provide a reagent of the foregoing character which is relatively stable and has a shelf life which permits ample time for distribution to users about the country and for permitting the analyzer equipment to operate from a supply of reagent sufficient for a number of weeks of operation.

As another object the invention aims to provide an improved buffering system in a colorimetric reagent for indicating total magnesium and calcium hardness of water and comprising a magnesium complex from which magnesium ions can be displaced by calcium ions in a sample being tested, and an indicator which combines with magnesium ions in the sample and displaced from the magnesium complex to provide a color change in accordance with the amount of magnesium ions combining therewith, the improved buffering system being effective to extend the pH range of samples which can be tested by the reagent.

Another object of the invention is the provision, in a colorimetric reagent of the type mentioned in the preceding paragraph, of an improved buffering system which acts as a preservative for the indicator dye so as to stabilize the reagent and make possible a shelf life therefor of a period of at least 45 days as compared to the 4 or 5 day period attained by prior buffering practice.

Yet another object is the provision of a buffering system the presence of which increases the sensitivity and reliability of the reagent by enhancing the color change of the indicator dye, whereby more accurate test results may be achieved.

It is a further object of the invention to provide, in a colorimetric reagent, a buffer system comprising a mixture of ethanolamines and hydrochloric acid in such proportions as to achieve the above mentioned objects of increased pH range, increased shelf life, and increased sensitivity or color change.

The invention may be further characterized as residing in a novel formulation of chemical ingredients in a combination which provides the aforementioned objects and advantages, as will be readily understood from the following detailed description of a preferred formulation embodying the invention.

In the drawings, the sole figure is a graphic illustration of light transmission versus hardness of samples tested with the reagent of this invention.

The preferred formula provides a reagent which is blue in color when mixed with sample water having zero hardness, and which gradually changes to a wine red as the hardness increases from zero to ten or more parts per million total hardness. The ability of the reagent containing sample to transmit red light (650 m$\mu$) therefore increases as hardness increases throughout the range of zero to ten or more parts per million, thereby making the reagent particularly suitable for measuring hardness with photo-electric colorimetric equipment such as that described in the above mentioned Patent No. 3,028,225. The accompanying graph, made from readings taken on that equipment, shows the relationship between the red light transmittal and total hardness in parts per million.

The hardness for which the reagent may be used as an indicator is that resulting from the presence of dissolved mineral salts containing magnesium and/or calcium, for example carbonates, sulphates, and the like, and which hardness is expressed in parts per million of calcium carbonate. The reagent comprises an indicator or dye material which is capable of combining with magnesium ions but not with calcium ions, and changes color in accordance with the amount of magnesium combining therewith.

In order to obtain a color indication which also includes the amount of calcium in a sample, the reagent comprises a magnesium complex from which magnesium ions may be displaced by calcium ions from the sample. The displaced magnesium ions combine with the indicator to contribute to the color change which then is indicative of the total magnesium and calcium hardness of the sample.

In the present example, the dye or indicator used is 1 - hydroxy-2-naphthanzo-5-nitro-2-naphthol - 5 - sulfonic acid-sodium salt, sold under the trade name "Eriochrome Black T" and referred to hereinafter as EBT. The magnesium complex (described more fully hereinafter) comprises magnesium disodium ethylene diamine tetraacetate (MgNa$_2$ EDTA).

One of the important features of the invention, namely the ability to operate as a hardness testing reagent with samples of widely varying pH, is accomplished by a buffer system which consists of a mixture of triethanolamine, monoethanolamine, and hydrochloric acid. While these ingredients do not enter into the actual hardness analysis, their presence in proper strength is important for several reasons including the maintenance in the samples being tested of a working pH in the range of 8.5 to 9.5 at which the reagent can provide the color changes described above for samples which differ in initial pH. The buffer system also serves an important purpose as a stabilizing preservative which extends the shelf life of the reagent to a period of at least 45 days, making the reagent particularly suitable for use in automatic colorimetric equipment and permitting supplies of reagent to be shipped to remote places for use. Also, the buffering system enhances the sensitivity of the reagent by aiding it in the absorption of light of wave lengths other than the red transmitted by the reagent upon color change.

An exemplary embodiment of the reagent may be prepared in accordance with the following table which lists the chemical items and the amount necessary for one liter of reagent. Of course it will be understood by those knowledgeable in the art that proportionate amounts may be used to prepare any desired volume of the reagent.

| Item: | Amount |
|---|---|
| EBT (1 - hydroxy - 2 - napthanzo - 5 - nitro- 2 - napthol - 5 - sulfonic acid-sodium salt) gram | 0.3 |
| Magnesium disodium ethylene diamine tetraacetate, 10% solution ml | 20.0 |
| Triethanolamine ml | 62.5 |
| Monoethanolamine ml | 20.0 |
| Hydrochloric acid, sp. gr. 1.19, 37% ml | 20.0 |
| Detergent (non-ionic) [e.g. that sold under trademark "Aquet"] gram | .05 |
| Distilled water ml | 180.0 |
| Isopropanol, 99%, fill to 1 liter. | |

The magnesium complex ($MgNa_2$ EDTA), 10% wt./vol. solution, may be obtained commercially or prepared from the following:

| | G. |
|---|---|
| Ethylene diamine tetraacetate acid | 81.04 |
| Magnesium metal (reagent turnings) | 6.74 |
| Sodium hydroxide | 22.18 |
| Deionized distilled water, to 1 liter. | |

To a major portion of the water is added the EDTA acid and the magnesium metal. The sodium hydroxide is added as a 50% solution and the mixture is allowed to react with stirring overnight or until the solution is clear. When brought to one liter with the distilled water, ten ml of the solution is equivalent to one gram of $Na_2Mg$ EDTA.

When preparing the reagent of this invention according to the prior table, the $MgNa_2$ EDTA, 10% solution, and the EBT are mixed and dissolved in a portion of the distilled water. To this solution are added the ethanol amines. The hydrochloric acid is then mixed with the remaining water and added to the solution. The detergent and the isopropanol are then added, the latter as necessary to bring the solution to the desired volume of one liter in this example.

The resulting reagent, which is especially suitable for the determination of water hardness in conjunction with automatic photo-electric colorimetric apparatus, is characterized by its unique stability and long shelf life, by its ability to measure hardness regardless of the calcium to magnesium ratio, and by its ability to measure hardness in samples having widely varying pH values occurring, for example, between city water supplies and relatively strong acid media such as the effluent of hydrogen zeolite water softeners. It will be noted that the present reagent provides a means for water hardness analysis which differs from the known Schwarzenbach technique in that the present reagent provides a progressive change in color as a function of hardness rather than using a color change as a stoichiometric or end point indicator.

In use, a predetermined quantity of the reagent is added to a predetermined quantity of sample water, these quantities being determined in accordance with the colorimetric apparatus to be used, and the calibration characteristics thereof. The addition of the reagent to a sample produces and maintains therein pH in the range of 8.5 to 9.5 and preferably about 9.3, at which pH values the EBT indicator dye combines with the magnesium ions in preferance to calcium ions and in doing so changes color from blue to red in an amount corresponding to the amount of magnesium ions combining therewith.

At the same time calcium ions in the sample, which are also part of the total hardness, combine with the magnesium complex ($MgNa_2$ EDTA) forming a calcium chelate and releasing an equivalent amount of magnesium ions into the solution. The released magnesium ions in turn combine with the EBT contributing to color change thereof in the red direction an additional amount corresponding to the amount of calcium present in the sample. In this manner both the calcium and magnesium ion concentration is measured as total hardness.

Although the present invention has been described in considerable detail with reference to an exemplary formulation of a reagent embodying the invention, it will be understood that the invention is not limited thereto, but rather the invention includes all those substitutions, modifications, and equivalents as are reasonably embraced by the scope of the claim hereof.

Having described my invention, I claim:

A colorimetric reagent for indicating total magnesium and calcium hardness of water, one liter of which consists of: an indicator composed of approximately 0.3 gram of 1-hydroxy-2-napthanzo-5-nitro-2-napthol-5-sulfonic acid-sodium salt; a magnesium complex consisting of 20.0 ml. of 10% solution of a solution formed by 81.04 g. ethylene diamine tetraacetic acid, 6.74 g. magnesium metal, 22.18 g. sodium hydroxide in deionized distilled water to form 1 liter; 102 ml. of a buffer consisting of triethanolamine 62.5 ml., monoethanolamine 20.0 ml. and hydrochloric acid, sp. gr. 1.19, 37%, 20.0 ml., 180.0 ml. of distilled water; and the remainder of isopropanol 99%.

References Cited by the Examiner

UNITED STATES PATENTS 2,910,349   10/1959   Reeder et al. _____ 23—230

FOREIGN PATENTS 902,884   8/1962   Great Britain.

OTHER REFERENCES

Diskant: "Stable Indicator Solutions for Complexometric Determination of Total Hardness in Water," Analytical Chemistry, vol. 24, No. 11, November 1952, pp. 1856–57.

JULIUS GREENWALD, *Primary Examiner.*